(12) United States Patent
Dowling et al.

(10) Patent No.: US 6,551,491 B2
(45) Date of Patent: *Apr. 22, 2003

(54) METHOD AND SYSTEM OF PREVENTING CORROSION OF CONDUCTIVE STRUCTURES

(75) Inventors: David Dowling, New York, NY (US); Art Spivack, Wilmington, NC (US)

(73) Assignee: Applied Semiconductor, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/986,619

(22) Filed: Nov. 9, 2001

(65) Prior Publication Data

US 2002/0046956 A1 Apr. 25, 2002

Related U.S. Application Data

(63) Continuation of application No. 09/585,397, filed on Jun. 2, 2000, now Pat. No. 6,325,915.

(51) Int. Cl.$^7$ ................................................. C23F 13/00
(52) U.S. Cl. ....................... 205/725; 205/731; 205/734; 205/735; 205/740
(58) Field of Search ................................ 205/724, 725, 205/731, 734, 735, 740; 204/196.12, 196.16, 196.37

(56) References Cited

U.S. PATENT DOCUMENTS

| | | | |
|---|---|---|---|
| 3,562,124 A | 2/1971 | Leon et al. | 204/148 |
| 3,574,801 A | 4/1971 | Jauker | 264/37 |
| 3,620,784 A | 11/1971 | Schutt | 106/84 |
| 3,864,234 A | 2/1975 | Wasson | 204/197 |
| 4,010,759 A | 3/1977 | Boer | 128/419 P |
| 4,219,358 A | 8/1980 | Hayashi et al. | 106/1.17 |
| 4,381,981 A | 5/1983 | Maes | 204/197 |
| 4,836,768 A | 6/1989 | Wilson et al. | 428/323 |

(List continued on next page.)

FOREIGN PATENT DOCUMENTS

WO    WO 01/43173    6/2001

OTHER PUBLICATIONS

K. Hladky, et al., "The Measurement of Localized Corrosion Using Electrochemical Noise", Corrosion and Protection Centre, Umist, Manchester, England, pp. 1–7, www.kh-design.demon.co.uk/noise/paper1.htm.

"Electrochemical Noise Based Waste Tank Corrosion Monitoring", from Electrochemical Noise Based Corrosion Probe Overview, pp. 1–2, www.hanford.gov/twrs/corrosion/ec-n.htm.

"Electrochemical Noise Measurement System" from Non-Destructive Monitoring of Corrosion by Electrochemical Noise Measurement, 3 pp.

Technical Basis for Electrochemical Noise Based Corrosion Monitoring, 22 pp.

(List continued on next page.)

*Primary Examiner*—Bruce F. Bell
(74) *Attorney, Agent, or Firm*—Oblon, Spivak, McClelland, Maier & Neustadt, P.C.

(57) ABSTRACT

A system for preventing corrosion of a surface of a metal structure in contact with a corrosive environment comprising:
  (a) a semiconductive coating in conductive contact with at least part of the surface; and
  (b) an electronic filter for filtering corrosive noise
and a method of preventing corrosion using the system.

20 Claims, 2 Drawing Sheets

U.S. PATENT DOCUMENTS

| | | | |
|---|---|---|---|
| 4,863,578 A | | 9/1989 | Webster .................... 204/197 |
| 4,957,612 A | | 9/1990 | Stewart et al. ............. 204/196 |
| 5,009,757 A | | 4/1991 | Riffe et al. ................ 204/147 |
| 5,352,342 A | | 10/1994 | Riffe ........................ 204/147 |
| 5,425,867 A | | 6/1995 | Dawson et al. ........... 204/400 |
| 5,478,451 A | | 12/1995 | Riffe ........................ 204/147 |
| 5,496,359 A | * | 3/1996 | Davidson .................. 607/115 |
| 5,500,629 A | | 3/1996 | Meyer ...................... 333/181 |
| 5,868,920 A | | 2/1999 | Nylund et al. ............. 205/728 |
| 5,888,374 A | | 3/1999 | Pope et al. ............. 205/775.5 |
| 6,325,915 B1 | * | 12/2001 | Dowling et al. ........... 205/724 |

OTHER PUBLICATIONS

Chad A. Mirkin, et al., "Semiconductors meed biology", NATURE, vol. 405, Jun. 2000, 4 pp.

Marc W. Mittelman, "Recovery and Characterization of Biofilm Bacteria Associated with Medical Devices", Methods In Enzymology, vol. 310, 1999, pp. 534–551.

B.R. Mcleod, et al., "Enhanced Bacterial Biofilm control Using Electromagnetic Fields in Combination with Antibiotics", Methods in Enzymology, vol. 310, 1999, pp. 656–670.

David R. Clarke, et al., "Varistor Ceramics", J. Am. Ceram. Soc., vol. 82, No. 3, pp. 485–502, 1999.

Kirk–Othmer Encyclopedia of Chemical Technology, $4^{th}$ Ed., vol., 9, pp. 61–85 (1994).

Kirk–Othmer Encyclopedia of Chemical Technology, $4^{th}$ Ed., vol. 21, pp. 720–816 (1994).

* cited by examiner

METHOD AND SYSTEM OF PREVENTING CORROSION OF CONDUCTIVE STRUCTURES

This application is a Continuation of application Ser. No. 09/585,397 Filed on Jun. 2, 2000, now U.S. Pat. No. 6,325,915.

BACKGROUND OF THE INVENTION

1. Field of the Invention

The present invention relates to a method and system for the prevention of corrosion of conductive structures using semiconductor technology.

2. Discussion of the Background Art

A variety of methods for controlling corrosion have evolved over the past several centuries, with particular emphasis on methods to extend the life of metallic structures in corrosive environments. These methods typically include protective coatings which are used principally to upgrade the corrosion resistance of ferrous metals, such as steel, and some nonferrous metals, such as aluminum, and to avoid the necessity for using more costly alloys. Thus, they both improve performance and reduce costs. However, such protective coatings typically have several pitfalls, including poor applicability to non-metallic structures that suffer from corrosion or fouling.

Protective coatings fall into two main categories. The largest of these categories is the topical coating such as a paint, that acts as a physical barrier against the environment. The second category consists of sacrificial coatings, such as zinc or cadmium, that are designed to preferentially corrode in order to save the base metal from attack.

Cathodic protection and coatings are both engineering disciplines with a primary purpose of mitigating and preventing corrosion. Each process is different: cathodic protection prevents corrosion by introducing an electrical current from external sources to counteract the normal electrical chemical corrosion reactions whereas coatings form a barrier to prevent the flow of corrosion current or electrons between the naturally occurring anodes and cathodes or within galvanic couples. Each of these processes provided limited success. Coatings by far represent the most widespread method of general corrosion prevention (see Leon et al U.S. Pat. No. 3,562,124 and Hayashi et al U.S. Pat. No. 4,219,358). Cathodic protection, however, has been used to protect hundreds of thousands of miles of pipe and acres of steel surfaces subject to buried or immersion conditions.

The technique of cathodic protection is used to reduce the corrosion of the metal surface by providing it with enough cathodic current to make its anodic dissolution rate become negligible (for examples, see Pryor, U.S. Pat. No. 3,574,801; Wasson U.S. Pat. No. 3,864,234; Maes U.S. Pat. No. 4,381,981; Wilson et al U.S. Pat. No. 4,836,768; Webster U.S. Pat. No. 4,863,578; and Stewart et al U.S. Pat. No. 4,957,612). The cathodic protection concept operates by extinguishing the potential difference between the local anodic and cathodic surfaces through the application of sufficient current to polarize the cathodes to the potential of the anodes. In other words, the effect of applying cathodic currents is to reduce the area that continues to act as an anode, rather than reduce the rate of corrosion of such remaining anodes. Complete protection is achieved when all of the anodes have been extinguished. From an electrochemical standpoint, this indicates that sufficient electrons have been supplied to the metal to be protected, so that any tendency for the metal to ionize or go into solution has been neutralized.

Recent work in the study of corrosion has found that electrochemical corrosion processes appear to be associated with random fluctuations in the electrical properties of electrochemical systems, such as cell current and electrode potential. These random fluctuations are known in the art as "noise". Researchers have begun to apply noise analysis techniques to study the processes of corrosion in electrochemical systems.

Riffe, U.S. Pat. No. 5,352,342 and Riffe U.S. Pat. No. 5,009,757 disclose a zinc/zinc oxide based silicate coating that is used in combination with electronics in a corrosion prevention system. The zinc/zinc oxide particles in the coating are disclosed as having semiconductor properties, primarily a p-n junction at the Zn—ZnO phase boundary. When reverse biased, this p-n junction is described as behaving as a diode and inhibiting electron transfer across the boundary. This restriction limits electron transfer from sites of Zn oxidation to the sites of oxygen reduction on the ZnO surface. Effectively, there is increased resistance between the anode and cathode of local corrosion cells and corrosion is reduced.

On average, the Zn—ZnO based junction will be reversely biased due to the potentials associated with the oxidation of Zn at the Zn surface and the reduction of $O_2$ at the ZnO surface. However, significant stochastic voltage fluctuations occur. These voltage fluctuations cause the junction to episodically become forward biased. When forward biased, electron transfer across the junction increases and there is an acceleration of the oxidation of Zn and reduction of $O_2$. Effectively, there is a short circuit between the anode and cathode of local corrosion cells and corrosion is enhanced.

The Riffe patents disclose attachment of a fixed value capacitor in the electrochemical circuit of the corrosion prevention system. However, there is no way to control the level of capacitance nor any method suggested for determining the level of capacitance needed to effectively prevent corrosion in any given structure. Hence, it is necessary to use an overcapacitance in the system to be effective.

SUMMARY OF THE INVENTION

Accordingly, one object of the present invention is to provide a semiconductive coating that provides anticorrosion properties to any conductive structure.

A further object of the present invention is to provide a method for protecting conductive metallic structures from corrosion that is fine-tuned to the unique characteristics of the metallic structure.

A further object of the present invention is to provide a method for preventing corrosion of conductive structures by using semiconductor technology and with no external anode, no electrolyte, and no current flow.

A further object of the present invention is to provide a system for protecting conductive structures from corrosion, wherein the system provides long term protection with minimal system maintenance required.

These and other objects have been satisfied by the discovery of a semiconductive coating and associated electronic system, wherein the system can be operated by merely filtering voltage fluctuations in the conductive structure on which the semiconductive coating is placed, wherein the method for using the system comprises:

coating the conductive structure with a semiconductive coating with a fixed electronic filter connected to said coated structure, monitoring noise generated by said coating having said fixed electronic filter connected thereto, using an adjustable filter connected to said coating to determine an anti-corrosive filter response needed to minimize the noise generated by said coating; and replacing said adjustable filter with a passive or active filter having a filter response of at least said anti-corrosive filter response.

BRIEF DESCRIPTION OF THE FIGURES

A more complete appreciation of the invention and many of the attendant advantages thereof will be readily obtained as the same become better understood by reference to the following detailed description when considered in connection with the accompanying Figures, wherein.

DETAILED DESCRIPTION OF THE PREFERRED EMBODIMENTS

Figure 1:
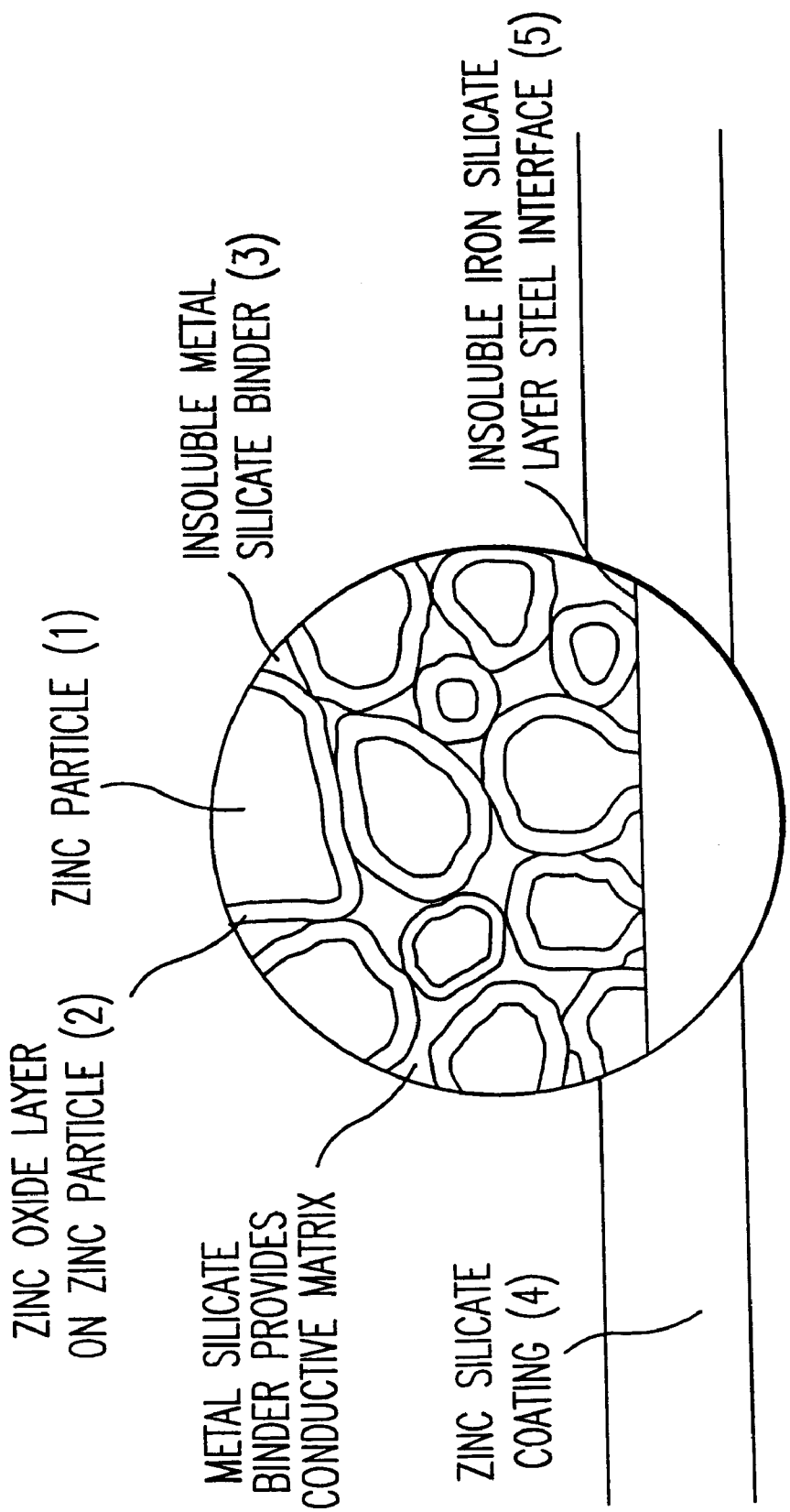
FIG. 1 is a graphical representation of the Zn/ZnO junction of a preferred embodiment of the present invention.

The present invention provides a method for the prevention of corrosion for any conductive structure susceptible to corrosion comprising coating the conductive structure with a semiconductive coating and connecting the resulting coated structure to a fixed electronic filter, monitoring the corrosive noise generated by the system, and determining the filter response needed to minimize the corrosive noise (within the context of the present invention, the term "corrosive noise" is used to describe the voltage fluctuations that occur due to the galvanic corrosion process). In one embodiment the present invention comprises adjusting the filter response using an adjustable filter to determine the filter response needed to minimize the noise generated by the coated structure, then replacing the adjustable filter with a passive electronic filter having at least the determined anti-corrosive filter response. In an alternative embodiment, the invention replaces the adjustable filter with an active electronic filter and monitoring system that continuously monitors the noise and automatically adjusts the filter response to minimize the fluctuations in the system.

The present invention minimizes this corrosive noise by coupling the semiconductive coating to an electronic filter. The electronic filter has a filter response, defined within the context of the present invention as the level of reduction of noise at a given frequency. As noted above, the filter can be a passive, low-pass RC filter or an active filter. In each case, the filter minimizes the voltage fluctuations. The junctions present in the semiconductor coating then maintain a reverse bias. The time-averaged electron flow from the anodic to the cathodic domains in the semiconductive coating is then reduced and the coating is effectively passivated.

A passive, low-pass RC filter is essentially a capacitor and a resistor. In the case of the present system, the semiconductive coating acts somewhat as the resistor, with a capacitor completing the RC filter. Suitable active filters include, but are not limited to, Butterworth filters, Bessel filters, and Sallen-Key filters. These active filters are commercially available and/or can be readily prepared by those of ordinary skill in the art. These active filters are basically an op-amp circuit with capacitors. Preferably, a main component of the filters of the present invention is a capacitor, wherein the filter response is related to the capacitance needed to provide the reduction of noise at the given frequency.

The noise measurement aspects of the present invention are used to fine-tune the design of the system for specific applications. Based on the measured noise, the requisite filter properties and location of filter installation in the system can be determined and improved for consistent corrosion prevention over the entire surface of the structure, even in very large structures, such as aircraft carriers or large span bridges. In the present invention, the voltage fluctuations between the coated surface and a low-noise, high impedance reference electrode are monitored. A suitable high impedance reference electrode can be prepared from a saturated calomel electrode or a saturated sulfate electrode, for example. A commercially available high impedance reference electrode suitable for this purpose can be obtained from various catalog equipment companies, such as Beckman Instruments or Corning. The noise can be monitored using these electrodes by use of an oscilloscope to show the voltage fluctuations. Alternatively, the data obtained from the electrodes can be stored and analyzed using a PC computer with an analog-digital converter, and analyzing the resulting data using time series analysis programs, such as fast Fourier transform (FFT) analysis or a maximum entropy method (MEM method). These methods can provide both real-time and delayed results, as desired. Using such methods permits determination of the level of filter response and placement of the filters needed to generate a nearly flat line on the oscilloscope (i.e. minimize the noise). This can be done at a single location of the structure, or for finer control, at a plurality of locations around the structure surface. The electronic filter properties and filter installation locations can be adjusted to minimize the measured voltage fluctuations, thus maximizing the passivation of the coating. The ultimate result is a dramatic increase in the lifetime of the corrosion prevention system for any desired structure type. This occurs due to the reduction of the corrosive noise, thus drastically reducing the sacrificial corrosion of the semiconductive coating.

The present invention also relates to a semiconductive coating that can be used with a variety of conductive substrates to provide an array of interesting properties. The semiconductive coating of the present invention can be any semiconductive coating, including but not limited to, semiconductive coatings having (a) both n-type and p-type semiconductor domains, (b) metal-semiconductor junctions, (c) ionic conductor-semiconductor junctions, (d) metal-semiconductor-ionic conductor junctions, (e) semiconductor-insulator-semiconductor junctions, and various combinations thereof. The semiconductive coating of the present invention can be used in a variety of end uses. Chief among these end-uses is the prevention of corrosion of conductive structures. The present system for preventing corrosion of conductive substrates comprises:

(a) a semiconductor coating in conductive contact with at least part of the surface of the conductive structure; and (b) means for filtering corrosive noise, wherein the means comprise an electron sink, such as a battery or other power supply, along with a filter, such as a capacitor, connected to the coated conductive substrate and the discovery of a corrosion prevention method comprising:

1) cleaning the external surface of a conductive structure;

2) coating the external surface with the semiconductive coating of the present invention; and 3) using an electronic filter to minimize corrosive noise in the system.

The key to the method and system of the present invention is the measurement of corrosive noise generated by the entire system (including, but not limited to, the substrate, coating and filter components) and minimizing that noise by application of an electronic filter.

In the embodiment for corrosion and fouling prevention, the present system comprises two interdependent components: (1) the semiconductive coating, and (2) a means for imparting a net negative bias to the conductive structure to which the coating is applied. In general the semiconductive coating is applied to the conductive surface after it has been cleaned, preferably by grit blasting to a commercial blast finish for metal surfaces or a comparable process for non-metallic conductive structures. When a conductive surface is cleaned by grit blasting or comparable methods, the surface will have numerous grooves or indentations of from 0.1 mil up to several mil in depth. The semiconductive coating of the present invention should be applied at a depth of at least 2 mil greater than the depth of the pits formed from the cleaning process, preferably from 2 to 10 mil thickness, most preferably 7 to 9 mil thick. On smooth surfaces without significant pits, the coating can be applied at thicknesses down to about 0.5 mil without detrimentally affecting the system performance.

The structure that can be protected using the present method and system can be any conductive material susceptible to corrosion. Preferably the structure is a metallic structure of a ferrous metal or non-ferrous conductive metal. Typical metals include, but are not limited to, iron, steel, and aluminum.

The semiconductive coating of the present invention is preferably a coating of a metal or metal alloy, with or without the presence of the oxide(s) of the metal(s) present. In a most preferred embodiment, the coating is a Zn/ZnO system. The metal or metal alloy can be used on its own or combined with a suitable coating binder. Coating binders include various silicate binders, such as sodium silicate, magnesium silicate, and lithium silicate. The metal or metal alloy in the coating must have a higher oxidation potential than the conductive material to be protected. Standard electrode potentials for most metals are well known and are reproduced below for a variety of different metals.

Standard Electrode Reduction Potentials (Relative to Hydrogen Electrode)

$Fe^{+2}+2e-Fe: -0.41$ $Zn^{+2}+2e-Zn: -0.76$ $Ti^{+2}+2e-Ti: -1.63$ $Al^{+3}+3e-Al: -1.71$ $Ce^{+3}+3e-Ce: -2.34$ $Mg^{+2}+2e-Mg: -2.38$ $Ba^{+2}+2e-Ba: -2.90$ $Cs^{+}+e-Cs: -2.92$ (Source: CRC Handbook of Chemistry and Physics, 60$^{th}$ ed., Ed. Robert C. Weast, CRC Press, Inc, Boca Raton, Fla. 1979)

Because the coating of the present system and method is sacrificial with respect to the conductive material being protected (although minimally sacrificial when the corrosive noise has been minimized), when determining the metal to be contained in the coating, it is important to select a metal having a standard electrode potential that is more negative than the conductive material to be protected. For example, to protect Fe (such as present in steel), the coating can use Zn, Ti or any of the other metals having a standard electrode potential more negative than −0.44. When protecting a metal having a very negative electrode potential, such as aluminum (−1.68), it is acceptable to use an alloy of a metal having a less negative electrode potential (such as Zn) combined with a metal having a more negative electrode potential (such as Mg). This alloy will provide the coating with the requisite sacrificial nature while avoiding the extreme oxidation that would occur with a coating containing only the highly negative electrode potential metal such as Mg. It is also possible to avoid a coating that is too quickly sacrificial by incorporating the highly negative electrode potential metal into one of the above noted binders. Instead of an alloy of two metals, the more negative electrode potential metal can be incorporated as the counterion of the silicate binder.

In a preferred embodiment, the semiconductive coating of the present invention can be the same coating as disclosed in Schutt, U.S. Pat. No. 3,620,784, Riffe, U.S. Pat. No. 5,352,342 or Riffe, U.S. Pat. No. 5,009,757 which are each hereby incorporated by reference. The basic building blocks of the inorganic zinc coating are silica, oxygen, and zinc. In liquid form, they are relatively small molecules of metallic silicate such as sodium silicate or organic silicate such as ethyl silicate. These essentially monomeric materials are crosslinked into a silica-oxygen-zinc structure which is the basic film former or binder for all of the inorganic zinc coatings. Suitable inorganic zinc coatings for use in the present invention are the various commercially available alkyl silicate or alkali hydrolyzed silicate types. One such commercially available coating is Carbozinc D7 WB™ manufactured by Carboline, Inc.

The coating of the present invention can also include additional n-type semiconductors incorporated into the coating, such as Sn/SnO. In addition, the coating can be doped with metals such as Al or Ga to increase the conductivity of the coating or 1–5% of Li to reduce the conductivity of the coating. The metal/metal oxide interface (Zn/ZnO) in the coating of the present invention acts as a diode in the electrochemical system. Thus, the coating contains many microdomains acting as diodes. Because of the corrosive noise generated by the coating, the diode periodically switches on and off due to fluctuations in the conductive potential of microdomains in the coating. This fluctuation of the conductive potential and switching of the diode causes the coating to corrode sacrificially. By reducing the conductivity of the coating by doping, such as with Li, it is possible to lower the switching potential of the diode to below the lowest point in the noise fluctuation curve. This will minimize the sacrificial corrosion of the coating, while still protecting the conductive material of the structure to be protected.

It may be added that by properly selecting the semiconductor coating material for a conductive surface, one can realize both the traditional passive as well as the novel active barriers.

In a preferred embodiment, the zinc dust of the coating of the present invention forms a metal-semiconductor junction where the zinc metal and zinc oxide interface, with the zinc oxide being an n-type semiconductor.

A preferred embodiment of the completed coating is schematically shown in FIG. 1. FIG. 1 shows the porous nature of the preferred zinc/zinc oxide/silicate coating (4) of the present invention. The zinc particles (1) are covered by a zinc oxide layer (2) with the various oxide coated particles surrounded by an insoluble metal silicate binder (3). At the interface (5) between the coating and the structure metal, is an insoluble metal silicate layer, which in the case of a steel structure would be an insoluble iron silicate layer.

The conductive structure of the present invention can be any conductive structure in need of protection from corrosion, including both metal structures and non-metal structures. Examples of such metal structures include metal vehicles, such as ships, planes, automobiles, military tanks or transports, metal vehicle parts, bridges, railroad coupling mechanisms, containers, pipes and metal towers, as well as smaller structures such as biomedical devices. Examples of metal vehicle parts include metal parts of vehicles such as automobiles, airplanes, trains, military land vehicles such as tanks, and ships and other marine vehicles. Examples of containers are refinery containers, storage silos and storage bins. Examples of non-metal conductive structures include conductive concrete and conductive polymeric structures. Corrosive processes also affect these non-metal conductive structures and can also be minimized by the present invention. Conductive concrete has been proposed as a possible material for preparation of floating airport runways. The system of the present invention would help prevent corrosion of the concrete, thus extending the life and structural integrity of the concrete structures.

One significant advantage obtained in the present invention is that by minimizing the sacrificial corrosion of the semiconductive coating, the life of the coating will be extended to be many times longer than that of conventional coating protection systems. While this would be possible to achieve under water through the application of cathodic current, it would require substantial current and would be very difficult to control. The method of the present invention functions internally to the coating and thus prevents atmospheric corrosion where the corroding medium is nothing more than moisture condensed from the air. This becomes extremely important in protecting such surfaces as the internal surfaces of modern ships, where designs to provide increased strengths have concomitantly increased corrosion prone areas, and in protecting automobile parts, bridges, airplanes, and trains.

Another preferred embodiment is the use of the present method and system on the internal surfaces of modern ships where the condensation is most corrosive due to its high saline content and where, at the same time, there is insufficient moisture for cathodic protection systems to function. Without the noise filter of the present invention, the zinc in the coating would quickly leach out and be eroded away by the flow of condensate to the bilges. However, upon the application of a noise filter in accordance with the present invention to the metallic substrate, this leaching is effectively halted.

Additionally, the use of a noise filter on the substrate steel of the ship provides no greater interference to shipboard electronics than turning on a light bulb within the ship, nor would it yield a detectable signal to hostile detection devices, since the noise filter, even those that use a battery or other source of electrons, does not produce a field that would radiate perceptibly beyond the coating. The absorbance characteristics of zinc are well known and are often used for EM shielding and electronics enclosures. Thus, there would also be no measurable EM radiation from shore-based structures to which the present system is applied.

The fixed electronic filter of the present invention acts as a capacitor having an electron sink attached thereto to keep the capacitor reverse biased. The fixed electronic filter is preferably a combination of a conventional power supply, for example a direct current (DC) power supply means such as a battery, preferably a 12 Volt battery, and solar cells and alternating current (AC) power supply means. It is to be noted that although this component is termed a "power supply" in the present description, there is no current and no voltage in the present system. Accordingly, the power supply nomenclature is merely for convenience and is not intended to imply electron flow. The power supply means used preferably would be sufficient to deliver a voltage of from 0.5 to 30 V, most preferably 10 to 20 V, if a completed circuit were available. The fixed electronic filter (i.e., power supply and capacitor) can be connected to the coated conductive substrate, either directly to the substrate or to the coating. In a preferred embodiment, the power supply means of the present invention has a negative terminal directly coupled to the conductive structure to be protected. The positive terminal of the power supply means is coupled to the conductive structure by way of the filter/capacitor, to a portion of the structure remote from the negative terminal connection. Since the present invention does not rely on creation of current flow, which drops off as the distance between terminals increases, the distance between the terminals is not critical, so long as the positive and negative terminals do not touch one another. The positive terminal connection is preferably made to a location on the structure from 0.01 meter to 30 meters from the location of the negative terminal connection, most preferably from 5 to 10 meters from the location of the negative terminal connection.

The method of the present invention is self-tending for the life of the system. There are no currents or potentials to monitor and control periodically as there would be in a conventional cathodic protection system. Further, there is no possibility that the present system can go out of control and severely damage the supporting structures as can occur in an impressed cathodic protection system. The only effective reduction in the life of the coating would therefore come from wind and water-borne abrasion. Since the abrasion resistance of the coating is somewhat better than that of galvanize, the life expectancy of the coating can be extended to the range of several decades.

Additionally, with the use of an active filter and monitoring system that continually monitors noise fluctuations and adjusts the filter properties, such as filter response and cutoff frequency, the coating lifetime can be extended by preventing increases in the rate of sacrificial loss due to increases in corrosion over time.

Figure 2:
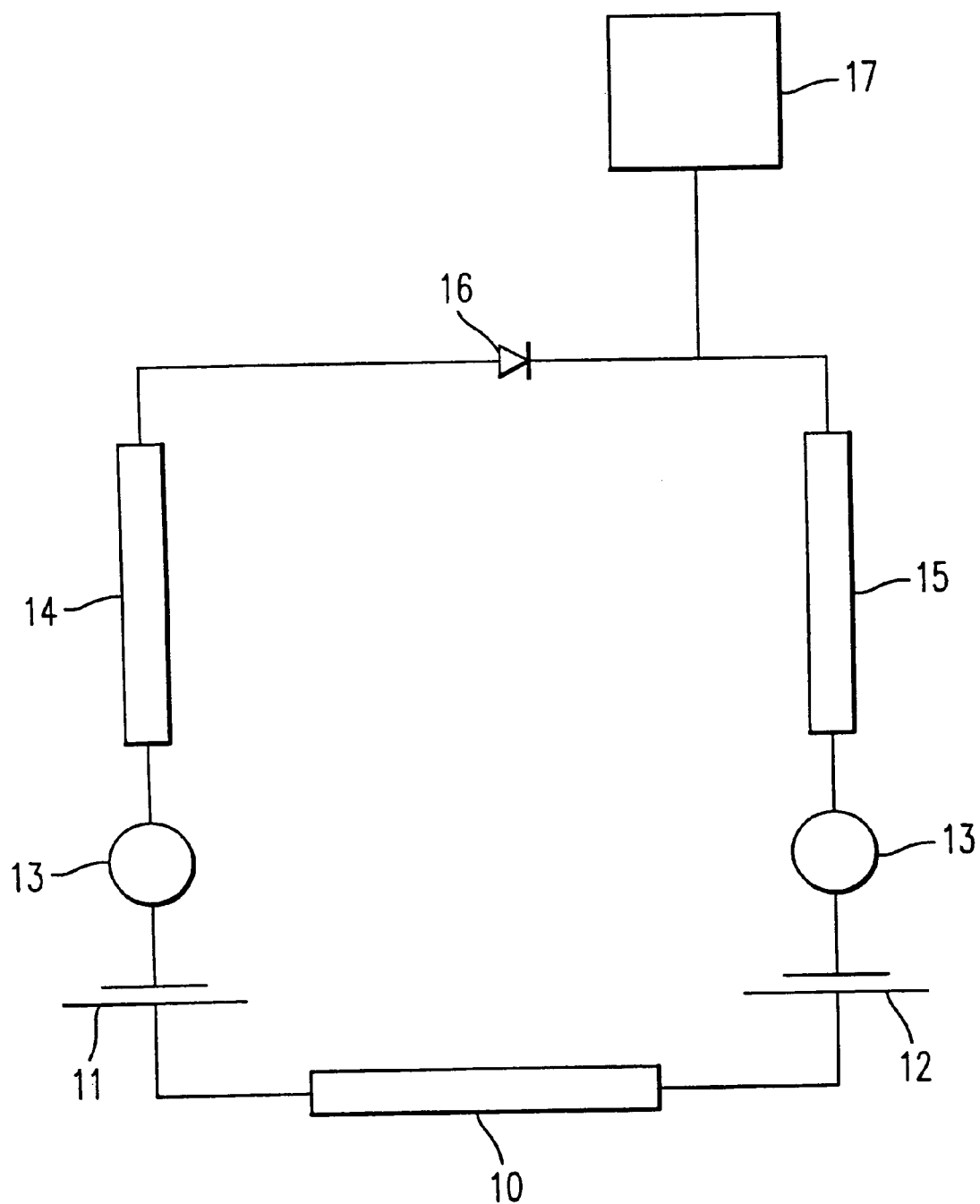
FIG. 2 shows an equivalent circuit diagram depicting the system of the present invention.

FIG. 2 shows an equivalent circuit diagram depicting the system of the present invention. In the circuit, 10 is the Solution resistance (Rs), with 11 and 12 being the galvanic electrode potential at the anode (Ea) and cathode (Ec), respectively. The noise source (En) in the circuit is represented by 13. The faradaic impedance of the anode (Ra) and cathode (Rc) are shown in 14 and 15, respectively. The metal-semiconductor junction at the Zn/ZnO boundary is shown as diode (D) 16. The noise filter (F), whether active or passive filter, is represented by 17.

Obviously, numerous modifications and variations of the present invention are possible in light of the above teachings. It is therefore to be understood that within the scope of the appended claims, the invention may be practiced otherwise than as specifically described herein.

What is claimed is:

1. A method for preventing corrosion of a conductive structure in contact with a corrosive environment, said method comprising:
    (a) coating the conductive structure with a semiconductive coating and providing a plurality of active electronic filters connected to the coated conductive structure at a plurality of locations;
    (b) continually monitoring corrosive noise generated by the coated conductive structure and continually adjusting one or more filter properties of said plurality of active electronic filters to minimize the corrosive noise.

2. The method of claim 1, wherein said electronic filter comprises a power source and a capacitor.

3. The method of claim 1, wherein said one or more filter properties are members selected from the group consisting of filter response and cutoff frequency.

4. The method of claim 1, wherein said conductive structure is a metal conductive structure.

5. The method of claim 4, wherein said metal conductive structure comprises a metal selected from the group consisting of ferrous metals and conductive non-ferrous metals.

6. The method of claim 5, wherein said metal is steel.

7. The method of claim 5, wherein said metal is aluminum.

8. The method of claim 1, wherein said conductive structure is selected from the group consisting of bridge members, railroad coupling mechanisms, refineries, containers, metal towers, and conductive concrete structures.

9. The method of claim 1, wherein said semiconductive coating contains both p-type and n-type semiconductor domains.

10. The method of claim 1, wherein said semiconductive coating contains a metal-semiconductor junction.

11. The method of claim 1, wherein said semiconductive coating contains an ionic conductor-semiconductor junction.

12. The method of claim 1, wherein said semiconductive coating contains a metal-semiconductor-ionic conductor junction.

13. The method of claim 1, wherein said semiconductive coating contains a semiconductor-insulator-semiconductor junction.

14. The method of claim 1, wherein said semiconductive coating is a metal/metal oxide/silicate coating.

15. The method of claim 14, wherein said metal/metal oxide/silicate coating is a zinc/zinc oxide/silicate coating.

16. The method of claim 15, wherein said zinc/zinc oxide/silicate coating comprises zinc in an amount of from 80–92% by weight based on dry coating.

17. The method of claim 16, wherein said zinc/zinc oxide/silicate coating comprises zinc in an amount of from 85–89% by weight based on dry coating.

18. The method of claim 14, wherein said metal/metal oxide/silicate coating comprises a metal selected from the group consisting of Zn, Ti, Al, Ga, Ce, Mg, Ba and Cs, and the corresponding metal oxide.

19. The method of claim 18, wherein said metal/metal oxide/silicate coating comprises a mixture of one or more metals selected from the group consisting of Zn, Ti, Al, Ga, Ce, Mg, Ba and Cs and one or more metal oxides obtained therefrom.

20. The method of claim 18, wherein said semiconductive coating further comprises one or more dopants.

* * * * *